Jan. 13, 1931. J. Q. HAMMETT 1,789,000
AEROFOIL
Filed April 3, 1930 2 Sheets-Sheet 1
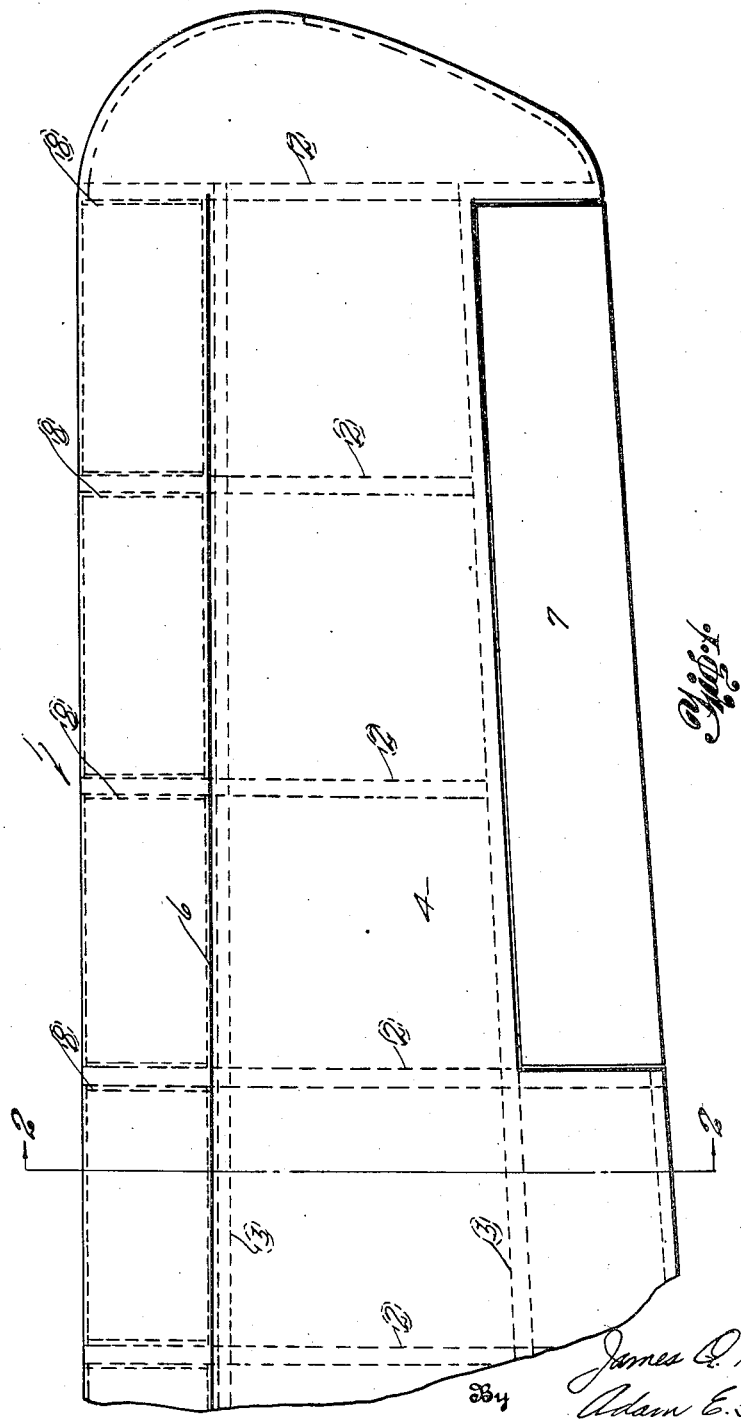
Inventor
James Q. Hammett
By Adam E. Fisher
Attorney Jan. 13, 1931.   J. Q. HAMMETT   1,789,000
AEROFOIL
Filed April 3, 1930    2 Sheets-Sheet 2
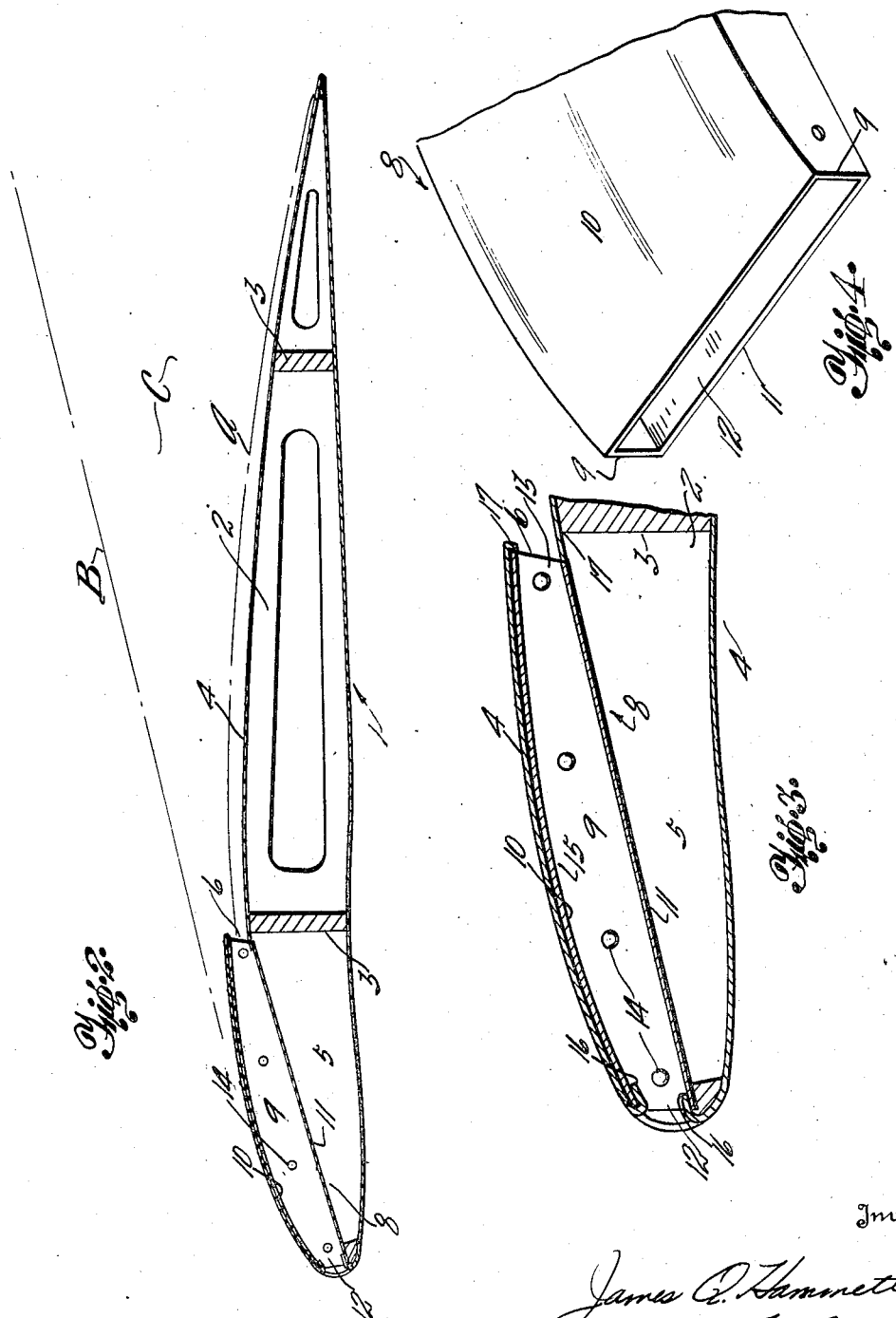
Inventor
James Q. Hammett
By Adam E. Fisher
Attorney Patented Jan. 13, 1931

1,789,000

UNITED STATES PATENT OFFICE

JAMES Q. HAMMETT, OF JUNCTION, TEXAS, ASSIGNOR OF FORTY PER CENT TO LEONARD F. COWSERT AND TWENTY PER CENT TO WILLIAM M. KEEN, BOTH OF JUNCTION, TEXAS

AEROFOIL

Application filed April 3, 1930. Serial No. 441,198.

This invention relates generally to improvements in aerofoils and more specifically to improvements in safety devices therefor of the type generally known as wing slots.

It is an accepted and generally used principle in aerodynamics that a small and relatively narrow wing having a concaved under surface may be mounted upon the leading edge of a sustaining or main aerofoil or wing of an aircraft and arranged so that it may be raised and thrust forwardly from the main aerofoil in such manner that air striking the wing assembly thus provided will be deflected by the concaved lower surface of the small wing and caused to follow the general contour of the upper camber of the main aerofoil instead of being deflected upwardly in the greater part at an angle from the aerofoil by the nose thereof. In this manner the air stream flowing over the aerofoil is brought nearer the controls or ailerons thereon allowing their effective operation even at very slow speeds of the aircraft and reducing the danger in the operation thereof. Further advantages of the use of this arrangement are well known to those skilled in the art.

It is the main object of my invention to provide a device built into or formed integrally with the aerofoil or wing itself and adapted to continuously operate to provide the results attained by the structure as recited above without the necessity of operating mechanism of any sort.

Another object is to provide a device for accomplishing the above results which may be readily and conveniently built into the wing or aerofoil structure without weakening the same in any way.

A further object is to provide a device of the kind described which will be simple and cheap in construction and durable and efficient in use.

The foregoing and other objects together with means whereby the same may be carried into effect will best be understood from the following description of a preferred embodiment of the invention taken in connection with the accompanying drawing wherein:

Figure 1 is a plan view of the end portion of an aerofoil to which the invention is applied.

Figure 2 is an enlarged section along the line 2—2 in Figure 1.

Figure 3 is a view similar to Figure 2 and enlarged relative to the same, this view showing only the forward portion of the wing.

Figure 4 is an enlarged perspective view of the forward portion of a box for mounting in the wing to provide an air passageway.

Referring now more particularly to the drawing the reference numeral 1 designates an aerofoil or wing formed in the usual manner of a framework comprising a plurality of spaced ribs 2 connected by longitudinally extending spars 3, the whole being enclosed by the wing covering 4 of any suitable material. The ribs 2 are conventional in form except that their nose portions 5 are enlarged vertically and terminate at their rear ends adjacent the center of gravity of the wing in the shoulders 6 disposed above the upper surface of the remainder of the wing. The usual ailerons are provided on the wing 1 as designated at 7.

Between each rib 2 is disposed a box 8 of suitable material, the same comprising the sides 9, top and bottom 10 and 11 and the open ends as shown at 12 and 13. Each box 8 is secured by means of rivets 14 or any other suitable fastening means between the nose portions 5 of the said ribs 2 with one open end 12 adjacent the leading edge of the wing and the other end 13 in alignment with the shoulders 6 formed on the ribs, each box thus extending angularly upward from their forward to their rear ends. The top 10 of each box is arched or bowed upward to substantially the contour of the upper surfaces of the nose portions 5 of the ribs 2 thus presenting a concaved underside 15 for a purpose to be described. In applying the wing covering 4 the same is split longitudinally of the wing along the leading edges thereof and between the ribs 2 and then turned inwardly and secured within the forward edges of the boxes 8 as at 16. The covering 4 is also split longitudinally in alignment with the rib shoulders 6 at the rear ends of the boxes 8 and secured thereto and to the ribs 2 and spars 3 as shown at 17. In this manner a plurality of uninterrupted passageways or shafts are formed through the nose portion of the wing for the passage of the air.

It will now be understood that a portion of the air striking the leading edge of the wing in flight will pass through the boxes 8 and be deflected downwardly by the concaved undersides 15 of the tops 10 of the said boxes and will travel along the upper surface of the wing. The path of this air stream is designated by the line A in Figure 2. Thus it will be seen that a current of air will be streaming past the ailerons 7 even at a very slow air speed allowing the effective operation of these control surfaces.

Another stream of air will be deflected upwardly by the upper surface of the nose of the wing and will take the course designated by the line B in Figure 2. The space C between these lines A and B will include a vacuum equal to that created by any wing structure now in use. However this vacuum in the space C will be relieved of its drag on the wing by the movement therearound of relatively slow moving currents of air which stray from the main air streams along the lines A and B thus making the effective lift of a wing equipped with the present invention considerably greater than an ordinary wing. This reduction of drag on the wing will also allow the use of a greater angle of attack, that is, a greater angle between the chord of the wing and its motion of travel and will also allow the use of a full cambered wing with its increased lift. A further advantage of the use of a wing incorporating the invention will be the reduced head resistance of the wing since the greater part of the nose or leading edge of the wing is open into the boxes 8. Additional advantages and safety features which are obtained by the use of the invention will be readily apparent to those skilled in the art.

Obviously the passageways for the air may be built into or mounted on the wing in various ways other than the use of the vent boxes 8 as here shown and such variations in construction are considered within the scope of the invention.

While I have herein set forth a certain preferred embodiment of the invention it is understood that I may vary from the same in minor structural details, so as best to construct a practical device for the purposes intended, not departing from the spirit of the invention and within the scope of the appended claims.

I claim:

1. In an aerofoil construction of the kind described, in combination with an aerofoil including a plurality of spaced ribs, boxes secured between the ribs and extended between the leading edge and upper surface of the aerofoil, the said boxes having their ends open and communicating with the exterior of the said aerofoil through the said leading edge and upper surface thereof.

2. In an aerofoil construction of the kind described, an aerofoil, the nose portion thereof being extended upwardly from the remainder of the aerofoil, a plurality of open ended boxes seated angularly in the aerofoil with their open ends communicating with the leading edge and rear edge of the upwardly extended nose portion thereof.

3. In an aerofoil construction of the kind described, in combination with an aerofoil including a nose portion extended upwardly above the plane of the remainder of the aerofoil, the said aerofoil also including a plurality of spaced ribs, a plurality of boxes open at their ends and comprising sides and top and bottom walls, the said boxes being secured by their sides to the said ribs within the nose portion of the aerofoil and with their open ends opening out through the leading edge and rear of the said nose portion of the aerofoil.

4. In an aerofoil construction of the kind described, in combination with an aerofoil including a nose portion extended upwardly above the plane of the remainder of the aerofoil, the said aerofoil also including a plurality of spaced ribs, a plurality of boxes open at their ends and comprising sides and top and bottom walls, the said boxes being secured by their sides to the said ribs within the nose portion of the aerofoil and with their open ends opening out through the leading edge and rear of the said nose portion of the aerofoil, the tops of the boxes being bowed upwardly to follow the contour of the upper surface of the nose portion of the aerofoil.

5. In an aerofoil construction of the kind described, an aerofoil having its nose portion extended upwardly beyond the plane of the remainder of the aerofoil, the said upwardly extended nose portion terminating at the center of gravity of the aerofoil, and an air passageway in the aerofoil extended angularly upward from the nose and terminating at the rear edge of the said upwardly extended nose portion.

In testimony whereof I affix my signature.

JAMES Q. HAMMETT.